(No Model.)

W. R. MIDDLETON.
PIPE COUPLING.

No. 310,300. Patented Jan. 6, 1885.

Witnesses.
J. H. Burridge,
J. P. Abbott

Inventor.
W. R. Middleton
W. H. Burridge, Atty.

N. PETERS, Photo-Lithographer, Washington, D. C.

UNITED STATES PATENT OFFICE.

WILLIAM R. MIDDLETON, OF CLEVELAND, OHIO, ASSIGNOR OF ONE-HALF TO HORACE TUTTLE, OF SAME PLACE.

PIPE-COUPLING.

SPECIFICATION forming part of Letters Patent No. 310,300, dated January 6, 1885.

Application filed October 5, 1883. (No model.)

*To all whom it may concern:*

Be it known that I, WILLIAM R. MIDDLETON, of Cleveland, Cuyahoga county, and State of Ohio, have invented a certain new and Improved Pipe-Coupling; and I do hereby declare that the following is a full, clear, and complete description thereof.

The coupling above mentioned is for the purpose of lengthening a pipe and connecting the pipe thus lengthened to a consecutive section of pipe, or for connecting the same to a tank, boiler, pump injector, or other article for which the original pipe was not long enough to reach. The coupling may also be used for shortening the aforesaid pipe to adapt it to some desired place or position, whereby is avoided the necessity of cutting the pipe to be lengthened and inserting a piece therein, or for cutting a piece out of the pipe that it may be shortened for the purpose specified. A full and complete description of the coupling above alluded to is as follows, reference being had to the drawings hereunto annexed and making a part of this specification, in which—

Figure 1:
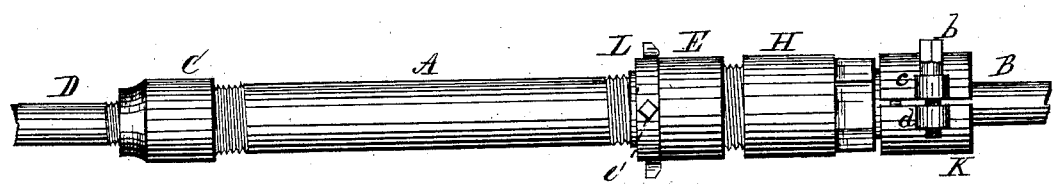
Figure 2:
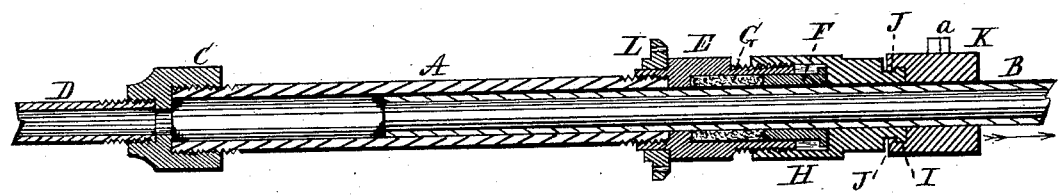

Figure 1 represents a side view of the coupling. Fig. 2 is a transverse longitudinal section.

Like letters of reference refer to like parts in both views presented.

A represents a piece of pipe, which may be several feet in length. The length, however, is not material, as it may be of any desirable length, and of sufficient caliber to allow the pipe to be lengthened (which B may indicate) to pass freely into it that it may slide easily therein. To one end of the pipe A may be secured, though not essential, a reducing collar, C, adapted to receive the pipe D, a consecutive section or continuation of the pipe B. To the opposite end of the pipe A is secured a thimble, E. A portion of the inner surface of the said thimble is chambered out, forming a stuffing-box, of which F is the follower or gland, and G the packing surrounding the pipe B. On the extended end of the stuffing-box or thimble E is a male thread, onto which is screwed a hollow nut, H, whereby the gland F, above referred to, is forced upon the packing for compressing it about the pipe B, thereby making the said pipe B in its connection with the inclosing pipe A, water-tight or steam-tight, as the case may be. On the end of the nut H is a collar, I, forming, with the shoulder of the nut, an annular groove in which are fitted the corresponding semi-annular ribs, J J, of the two-part clamp K, the two parts of which are connected to each other by set-screws *a* and *b*, screwed into the ears *c* and *d*, respectively, of the two parts of the clamp, as shown in Fig. 1, in which one pair of ears only are seen.

It will be observed in Fig. 2 that the two sections of the clamp close tightly upon the pipe B and clamp it firmly and securely in its connection with the nut H, and which cannot be pulled away therefrom in consequence of its connection therewith by the annular groove in the nut, the semi-annular ribs J of the clamp, and by virtue of the said nut being screwed into the thimble E, and said thimble in turn being screwed to the inclosing-pipe A. The pipe B is therefore connected in a firm and secure manner to the said inclosing-pipe, and thereby put in open communication with the consecutive pipe D, which, as hereinbefore said, is or may be a continuation of the pipe B.

It will be apparent from the above-described coupling that a connecting-pipe can be either lengthened or shortened, as the case may demand, without cutting the pipe for that purpose. For illustration, let it be supposed that the pipe D is connected to a steam-boiler, and that the pipe B is attached to an ejector located in a mine or in any other place, and that the distance between the boiler and the ejector is made up by the pipes D and B and the coupling above described.

The inclosing-pipe A, as above said, may be of any desirable length—say seven or ten feet, more or less—as a connecting-link between the two pipes B and D. The pipe B extends into the pipe A a considerable distance, more or less, according to the length of the pipe A. In the event it becomes necessary to drop the ejector farther from the boiler, the pipe connecting the one to the other must be lengthened accordingly. To this end the clamp K is loosened, and the pipe B is drawn out in the direction of the arrow far enough to make its connection again with the ejector, which on being done the clamp is again made fast to the pipe thus drawn out, and should there be any leak around the pipe in the coupling the nut is given a turn, thereby closing the packing around the pipe. *Per contra*, should it be necessary to move the ejector nearer the boiler, the connection must be shortened accordingly, which is easily and readily done by pushing the pipe B into the inclosing-pipe A, and the connection again made as before.

From the above description of the practical operation of the coupling, it will be obvious the lengthening and shortening of a connecting-pipe can be done without cutting the pipe and inserting a piece of pipe therein that the increased distance between the boiler and the ejector may require, or to shorten up the connecting-pipe by cutting a piece out of it, which in both cases must necessarily be done when the connection of the boiler and ejector is made by a continuous pipe.

What I claim as my invention, and desire to secure by Letters Patent, is—

In a pipe-coupling, the pipe A, having secured on one end thereof a thimble forming a stuffing-box gland, packing, and a hollow nut, said nut being provided with an annular groove and two-part clamp K, having, respectively, annular ribs adapted to fit the said annular grooves, in combination with the connecting-pipe B, substantially as and for the purpose described.

In testimony whereof I affix my signature in presence of two witnesses.

WILLIAM R. MIDDLETON.

Witnesses:
 WILLIAM H. REED,
 JOSEPH SUSOR.